United States Patent

Morimoto et al.

[11] Patent Number: 5,975,029
[45] Date of Patent: Nov. 2, 1999

[54] METHOD AND DEVICE FOR COLLECTING POULTRY AND TRANSPORTING THE POULTRY TO A SLAUGHTERHOUSE

[75] Inventors: Samon Morimoto, Yokohama, Japan; Adrianus J. van den Nieuwelaar, Gemert, Netherlands

[73] Assignee: Stork PMT B.V., Netherlands

[21] Appl. No.: 08/999,310

[22] Filed: Dec. 29, 1997

[30] Foreign Application Priority Data

Jan. 3, 1997 [NL] Netherlands ............................ 1004927

[51] Int. Cl.$^6$ .............................. A01K 29/00; A22B 3/00
[52] U.S. Cl. .............................. 119/843; 452/53; 119/401
[58] Field of Search .................................. 119/401, 843, 119/844, 845, 846; 452/53, 57, 66, 183; 296/24.2

[56] References Cited

U.S. PATENT DOCUMENTS

| | | | |
|---|---|---|---|
| 3,389,780 | 6/1968 | Jerome | 119/846 |
| 3,420,211 | 1/1969 | Hartvickson | 119/846 |
| 3,507,002 | 4/1970 | McDonald | 452/53 |
| 3,519,433 | 7/1970 | Reece | 452/66 |
| 3,568,642 | 3/1971 | Hamby | 119/53.5 |
| 3,568,643 | 3/1971 | Wessinger | 119/844 |
| 3,683,862 | 8/1972 | Reynolds | 119/844 |
| 3,805,743 | 4/1974 | Crowder | 119/846 |
| 3,805,744 | 4/1974 | Jochum | 119/845 |
| 3,916,835 | 11/1975 | Reynolds | 119/401 |
| 4,037,565 | 7/1977 | Ledwell, Jr. | 119/846 |
| 4,301,769 | 11/1981 | Mola | 119/844 |
| 4,508,062 | 4/1985 | Berry et al. | 119/846 |
| 4,513,689 | 4/1985 | Berry et al. | 119/846 |
| 4,751,767 | 6/1988 | Walther | 452/53 |
| 4,947,802 | 8/1990 | Fisinin et al. | 119/677 |
| 5,435,776 | 7/1995 | Owen et al. | 452/66 |
| 5,487,699 | 1/1996 | Tyrrell et al. | 452/53 |
| 5,643,072 | 7/1997 | Lankhaar et al. | 452/66 |
| 5,788,564 | 8/1998 | Chamberlain | 452/66 |

FOREIGN PATENT DOCUMENTS

| | | |
|---|---|---|
| 0 024 266 A2 | 2/1981 | European Pat. Off. . |
| 0 129 302 A1 | 12/1984 | European Pat. Off. . |
| 0 143 505 B1 | 3/1988 | European Pat. Off. . |
| 0 147 877 B1 | 9/1988 | European Pat. Off. . |
| 0 481 800 A1 | 4/1992 | European Pat. Off. . |
| 0 563 353 B1 | 10/1993 | European Pat. Off. . |
| 2 627 948 | 9/1989 | France . |
| 1005739 | 9/1965 | United Kingdom . |
| 1 573 055 | 8/1980 | United Kingdom . |
| 2 128 870 | 5/1984 | United Kingdom . |
| 2 129 393 | 5/1984 | United Kingdom . |
| 2 138 763 | 10/1984 | United Kingdom . |
| WO 88/07328 | 10/1988 | WIPO . |
| WO 94/08451 | 4/1994 | WIPO . |

OTHER PUBLICATIONS

Patent Cooperation Treaty (PCT) Report Concerning Novelty Search of International Type issued in corresponding Netherlands Application No. 1004927 and English translation.

*Primary Examiner*—Robert P. Swiatek
*Assistant Examiner*—Elizabeth Shaw
*Attorney, Agent, or Firm*—John S. Pratt; Kilpatrick Stockton LLP

[57] ABSTRACT

A method and device for collecting poultry and transporting the poultry to a slaughterhouse, in which the birds are at least partially made unconscious prior to their arrival at the slaughterhouse. Prior to or during their collection, the birds can be conveyed through a tunnel containing a stunning gas. A goods vehicle for carrying crates or containers with poultry to a slaughterhouse can be provided with means for introducing a stunning gas into the crates or containers.

21 Claims, 5 Drawing Sheets

METHOD AND DEVICE FOR COLLECTING POULTRY AND TRANSPORTING THE POULTRY TO A SLAUGHTERHOUSE

BACKGROUND OF THE INVENTION

This invention relates to a method for collecting poultry and transporting the poultry to a slaughterhouse. The invention also relates to a device for collecting poultry prior to transportation of the poultry to a slaughterhouse. In addition, the invention relates to a goods vehicle for transporting the poultry to a slaughterhouse.

DISCUSSION OF THE PRIOR ART

On a breeding farm birds are usually reared in houses in which they can move around freely on a large floor area. When the birds meet predetermined criteria concerning their age, weight and health they are collected and transported to a slaughterhouse, where they are slaughtered and processed further into a wide range of products.

In a method which is known from, for example, European patent application no. 0,481,800, U.S. Pat. No. 4,037,565 and European patent application no. 0,147,877 the birds are collected by a pick-up assembly which moves to and fro over the floor of the house and has conveying means for conveying birds to a collection point, where they are loaded into crates or containers. The crates or containers are then loaded onto a lorry and transported to the slaughterhouse.

In other systems, which are known from, for example, U.S. Pat. No. 3,568,642 and U.S. Pat. No. 3,683,862, the birds are loaded into compartments of a lorry by conveying the birds through a pipeline by means of an air stream created in the pipeline.

In the known methods and devices the problem occurs that the birds are subjected to considerable stress by their collection and transportation, which does not contribute to the welfare of the birds, or to the quality of the products obtained in the slaughterhouse. Moreover, there are great risks of injury to and suffocation of the birds in the crush which occurs during collection when the birds are being rounded up and taken to collection means, and also in the crush which occurs in the crates and containers during transportation.

In order to reduce the stress experienced by the birds, they are generally collected at night in the dark, but this has not led to sufficient quality improvement, and it is also relatively expensive because of the higher wage costs for the labour to be employed at night.

SUMMARY OF THE INVENTION

The object of the invention is to achieve a considerable reduction of the stress to which the birds are exposed during their collection and transportation to the slaughterhouse, so that the welfare of the birds is improved, the risks of injuries and suffocation are considerably reduced, and the processing of the birds in the slaughterhouse can be carried out with a better result.

Another object of the invention is to make it possible for the poultry to be collected also during the day.

These objects are attained in the method according to the invention, wherein the birds are at least partially made unconscious prior to their arrival at the slaughterhouse. The result of this is that the birds are less aware, or totally unaware, of the handling operations occurring during their collection and transportation, with the result that a physical and/or mental reaction to such handling operations is reduced or suppressed completely.

It is preferably ensured that the birds are at least partially made unconscious for a predetermined period of time which is sufficient for carrying out all handling operations, or at least the handling operations which are physically and/or mentally the most stressful for the birds.

One of such very stressful handling operations is the collection of the birds, so that it is preferable for the birds to be at least partially made unconscious prior to or during their collection, in particular until the birds have been loaded onto a goods vehicle after their collection.

In a preferred embodiment of the method according to the invention the birds are made at least partially unconscious by administering a stunning fluid to them, for example by conveying the birds through a tunnel containing a stunning gas. Such tunnels are known and have proved very effective in use. However, it is also possible to bring the birds into contact with a stunning agent in vapour or liquid form.

On the other hand, it is also possible to bring the birds into contact with at least one electrode which is capable of making a suitable stunning current flow through the body of the poultry.

It is also possible to give the birds a feed containing a stunning agent, for example prior to their collection. After the stunning agent has taken effect, the birds can be collected and loaded very easily into crates or containers with minimal physical and/or mental stress caused to them.

Apart from the at least partial unconsciousness induced prior to or during the collection of the birds, or in addition thereto, in a preferred embodiment of the method according to the invention the birds are at least partially made unconscious during transportation in crates or containers in a goods vehicle by introducing a stunning gas into the crates or containers on the goods vehicle. Undesirable physical and/or mental reactions of the birds to the unloading of the crates or containers at the slaughterhouse can be reduced or suppressed completely in this way.

The device according to the invention, comprising pick-up means for picking up the birds; and conveying means of conveyance for conveying the birds picked up in the pick-up means to collection means, is characterized according to the invention by a stunning device which is set up in the path of the conveying means. The device provides for at least partial unconsciousness of the birds during conveyance of the birds from the pick-up means to the collection means. The stunning device can comprise a tunnel to which a stunning gas or gas mixture is supplied from one or more tanks, but it can also comprise at least one electrode which is adapted to come into contact with the birds, or can comprise fluid-administering means which are adapted to administer a stunning fluid to the birds.

Expedient conveying means are, for example, a belt conveyor or a gas stream.

Expedient collection means comprise, for example, a lifting platform, which is movable in the horizontal and vertical directions, a belt conveyor, or a rotary table.

The poultry collection device is preferably mobile, so that it can be set up easily in an advantageous place or can be driven through a poultry house during use.

According to the invention, a goods vehicle for transporting birds to a slaughterhouse, with a loading space for the accommodation of crates or containers containing the birds, is characterized by means for introducing a stunning gas, supplied from one or more tanks, into the crates or containers.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 3b shows a diagrammatic longitudinal cross-section of the device according to FIG. 3a;

FIG. 4b shows a diagrammatic longitudinal cross-section of the device according to FIG. 4a;

DESCRIPTION OF THE PREFERRED EMBODIMENTS

Figure 1:
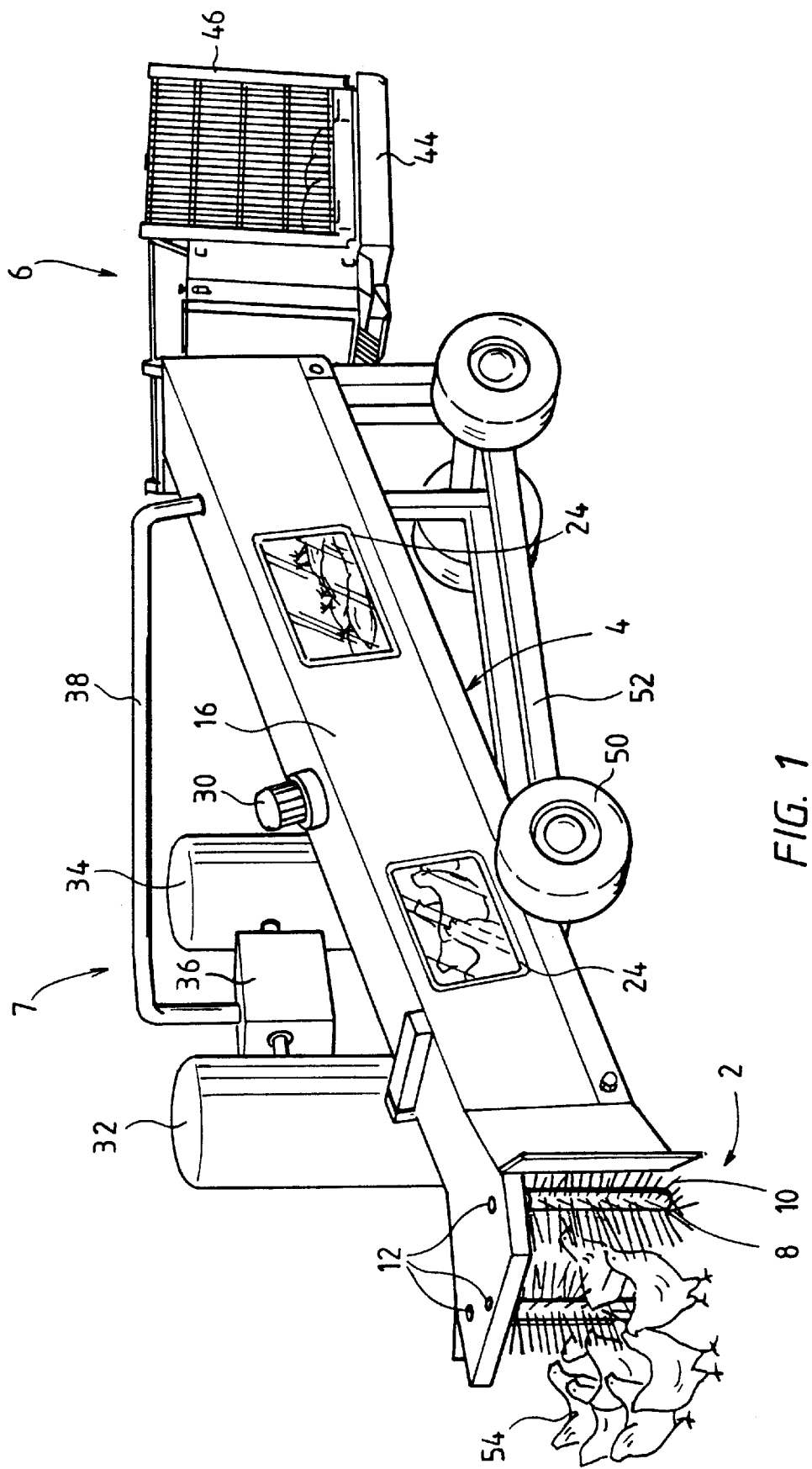
FIG. 1 shows a view in perspective of a mobile poultry collection device according to the invention.
Figure 2A:
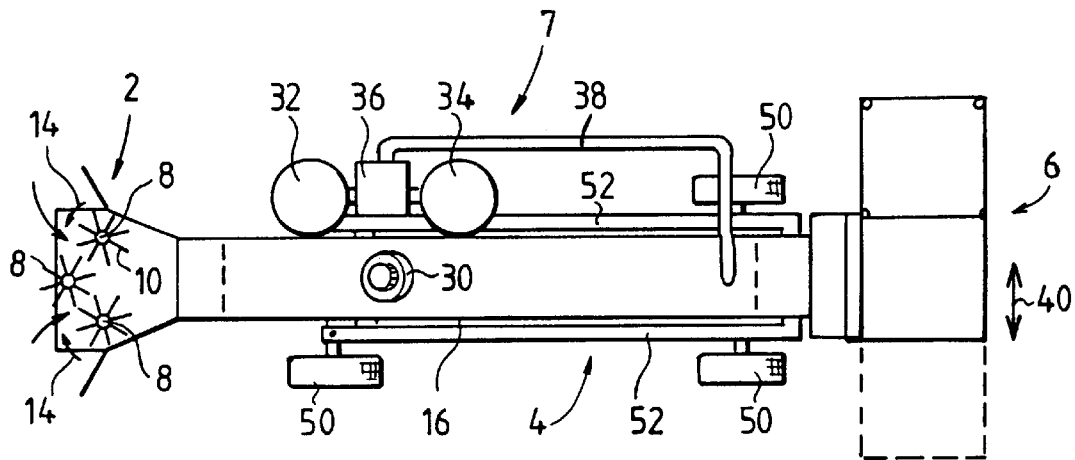
FIG. 2a shows a diagrammatic top view of the device according to FIG. 1.
Figure 2B:
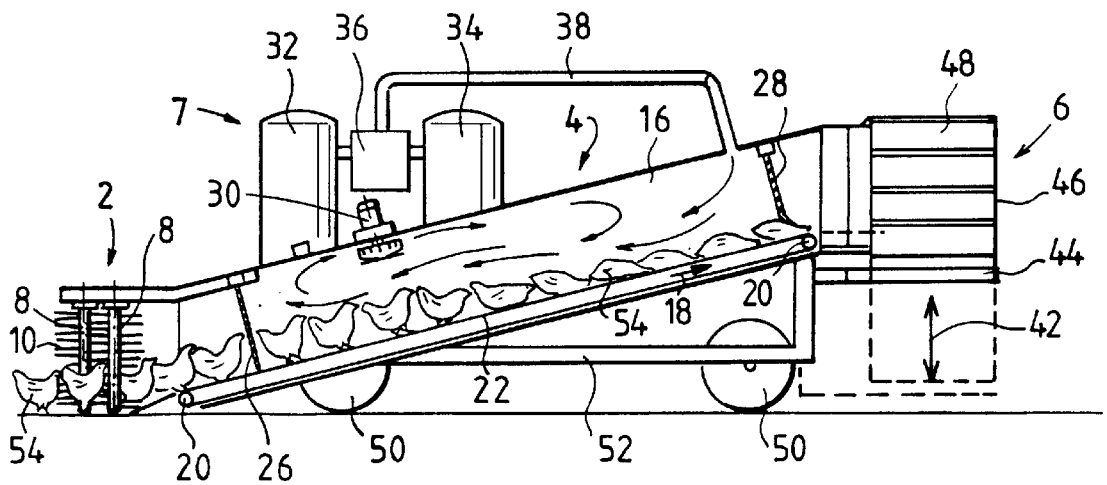
FIG. 2b shows a diagrammatic longitudinal cross-section of the device according to FIG. 1.

FIGS. 1, 2a and 2b show a poultry collection device with pick-up means 2, conveying means 4, collection means 6 and a gas supply device 7. The pick-up means 2 comprise a number of (in this case three) brushes 8 which are provided in a known manner with flexible, substantially radially projecting fingers 10, at least two of which brushes being driven in a rotary manner (not shown in any further detail) about an axis 12 in the direction indicated by arrows 14.

The pick-up means 2 are connected to the conveying means 4, which comprise a tunnel 16 in which a conveyor belt 22, which is passed around two rollers 20 and is driven in the direction of arrow 18 in a manner not shown in any further detail, is set up. The wall of the tunnel 16 is substantially gastight and is provided with windows 24 for observation of the inside of the tunnel 16. A movable and passable closing means 26 is fitted at the end of the tunnel 16 facing the pick-up means 2, while a movable and passable closing means 28 is also fitted at the end of the tunnel 16 facing away from the pick-up means 2. The closing means 26 and 28 can be, for example, swing doors, curtains with a surface area which is substantially equal to that of the cross-section of the tunnel, or strip curtains.

A fan 30 is fitted in the top wall of the tunnel 16, which fan ensures that the atmosphere in the area bounded by the walls of the tunnel 16 and the closing means 26 and 28 is kept moving, so that the atmosphere inside the bounded space is as homogeneous as possible. The composition of the atmosphere is determined by supplying gas or a gas mixture from tanks 32 and 34 through a mixing device 36 and through a line 38 to the abovementioned bounded area.

The conveying means 4 are connected to the collection means 6, which comprise a movable platform 44 which is driven in a manner not shown in any further detail in the directions of double arrows 40 (FIG. 2a) and 42 (FIG. 2b). A crate or a container 46 with a number of (in this case four) compartments 48 can be placed and moved on the platform 44.

The unit comprising the pick-up means 2, conveying means 4, collection means 6 and gas supply device 7 is fixed on a frame 52 provided with wheels 50 in such a way that it is mobile. By the way, the gas supply device can also be set up at a fixed point, and can be connected to the tunnel 16 by means of a flexible line 38.

In use, the brushes 8 are set in motion according to the arrows 14, and gases are supplied from the tanks 32 and 34 to the mixing device 36 for supplying the gases in a predetermined proportion through the line 38 to the area of the tunnel 16 bounded by the closing means 26 and 28. The fan 30 spreads the gases uniformly through the bounded area, so that the concentration of the gases is substantially the same everywhere. A container 46 is placed on the lifting platform 44, the bottom compartment of which container is open at the side facing the conveying means 4. The conveyor belt is set in motion in the direction of the arrow 18. Birds 54 are supplied to the pick-up means 2 of the poultry collection device, which birds are driven into the tunnel 16 by contact with the fingers 10 of the brushes 8 and arrive on the belt conveyor 22. The birds 54 subsequently pass the closing means 26, after which they arrive in the above-mentioned bounded area of the tunnel 16, into which a gas mixture of a predetermined composition is introduced. The composition of the gas mixture is selected in such a way that the birds become at least partially unconscious during the time when they are in the above-mentioned bounded area. If they are sufficiently deeply unconscious, the birds 54 will ultimately lie in an unconscious state on the downstream part of the belt conveyor 22. The birds 54 leave the above-mentioned bounded area in the at least partially unconscious state by way of closing means 28 and arrive in the bottom compartment of the container 46. For the most uniform possible loading of the compartment, the container moves in one or both of the directions indicated by the double arrow 40 during this process. When the bottom compartment is completely filled, the container 46 is moved down by the height of one compartment, after which the compartment situated directly above the bottom compartment of the container 46 is filled in the same way as the bottom compartment, i.e. by moving the container 46 sideways, taking into account the extent of supply of at least partially unconscious birds. Of course, it is also possible to begin the filling of the container with the top compartment, or to choose any other desired compartment for it. When the container has been filled completely, it is removed from the lifting platform 44 and replaced by an empty container.

The movement of the lifting platform 44 with the container in the directions indicated by the arrows 40 and 42 can be fully automatic, for example in a preprogrammed manner, or dependent on an output variable of a counter mechanism (not shown in any further detail) which is fitted in the tunnel 16 and records the number and the supply speed of the birds 54 and synchronizes the movements of the lifting platform 44 therewith.

Figure 3A:
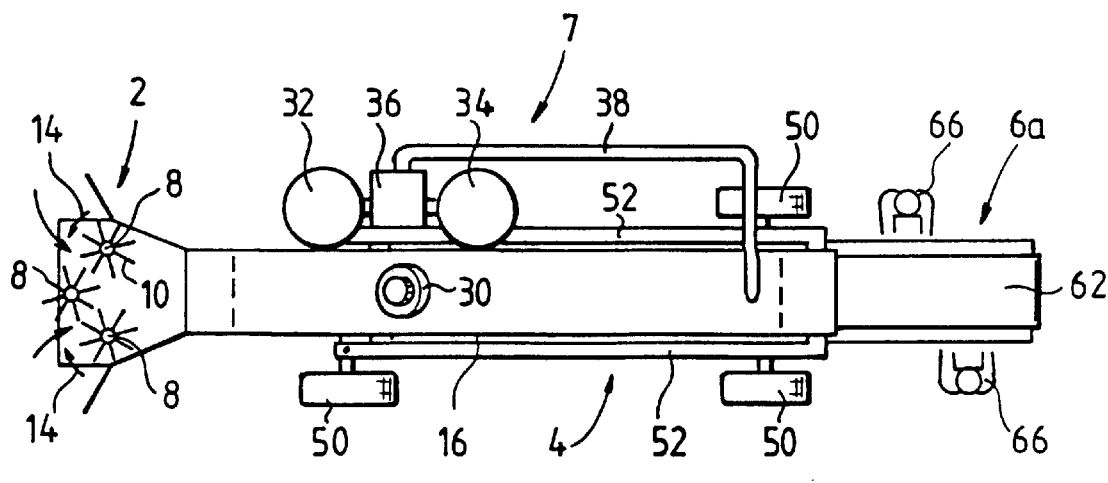
FIG. 3a shows a diagrammatic top view of a first alternative embodiment of the device according to FIG. 1.
Figure 3B:
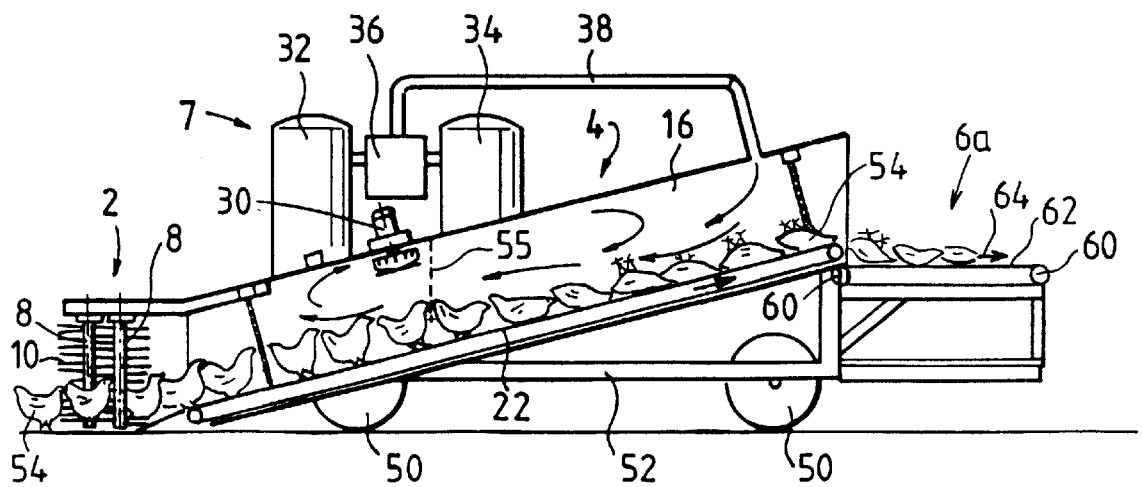

As regards the pick-up means 2 and the means of conveyance 4, the layout and operation of the poultry collection device according to FIGS. 3a and 3b corresponds entirely to that according to FIGS. 1, 2a and 2b. However, the poultry collection device according to FIGS. 3a and 3b is provided with different collection means 6a in the form of a belt conveyor 62 which is passed around two rollers 60, and which is driven in a manner not shown in any further detail in the direction of arrow 64. When the at least partially unconscious birds 54 leave the belt conveyor 22, they arrive on the belt conveyor 62, from which they are removed by persons 66. Owing to the at least partially unconscious state of the birds, it is easy for the persons 66 to handle them and deposit them in, for example, a crate or a container, while the birds themselves experience no stress from such handling operations. When the birds regain consciousness, they are already in a closed crate or container, or are already being transported to a slaughterhouse. The at least partially unconscious state can even be of such long duration that the birds never fully regain consciousness before they are slaughtered.

Figure 4A:
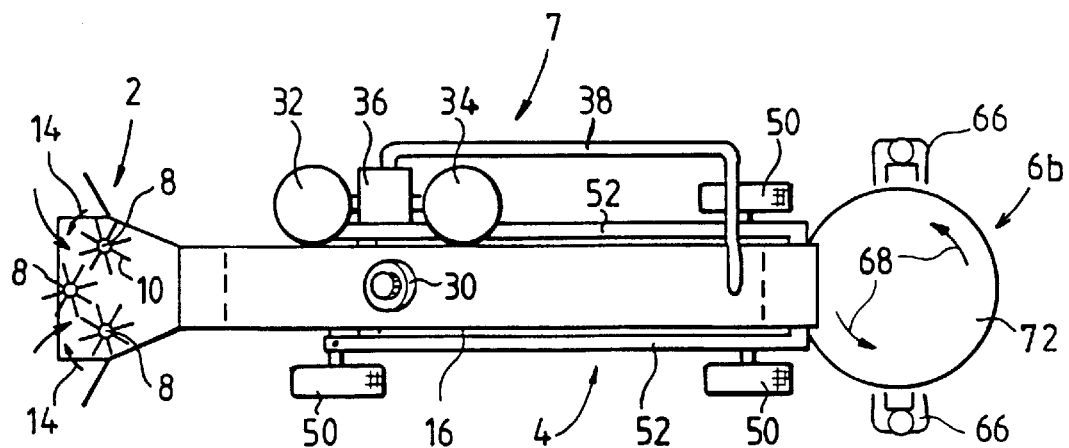
FIG. 4a shows a diagrammatic top view of a second alternative embodiment of the device according to FIG. 1.
Figure 4B:
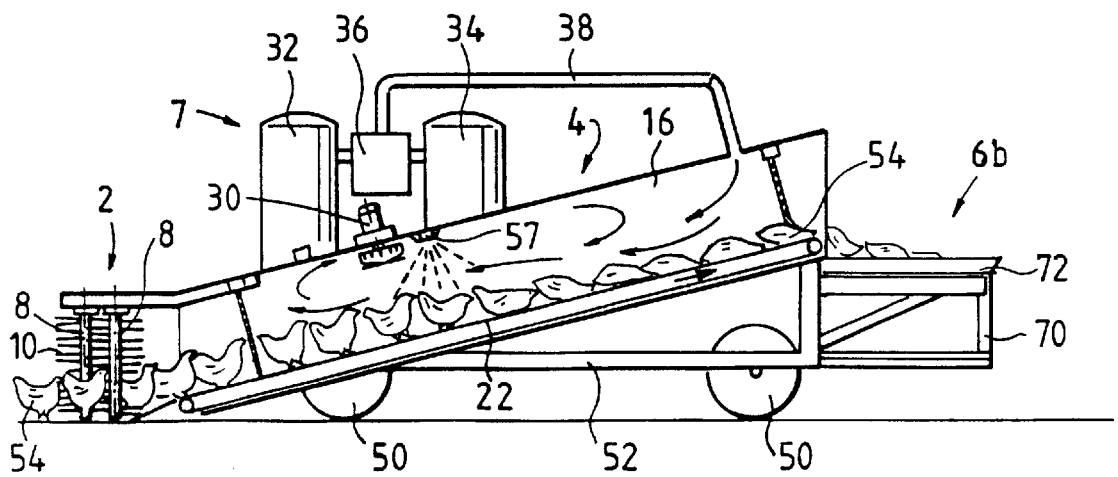

By way of alternative to the belt conveyor 62 shown in FIGS. 3a and 3b, it is also possible—as shown in FIGS. 4a and 4b—to use a table 72 which is fitted on an auxiliary frame 70 and rotates according to arrows 68, and which is driven in a manner not shown in any further detail.

Figure 5A:
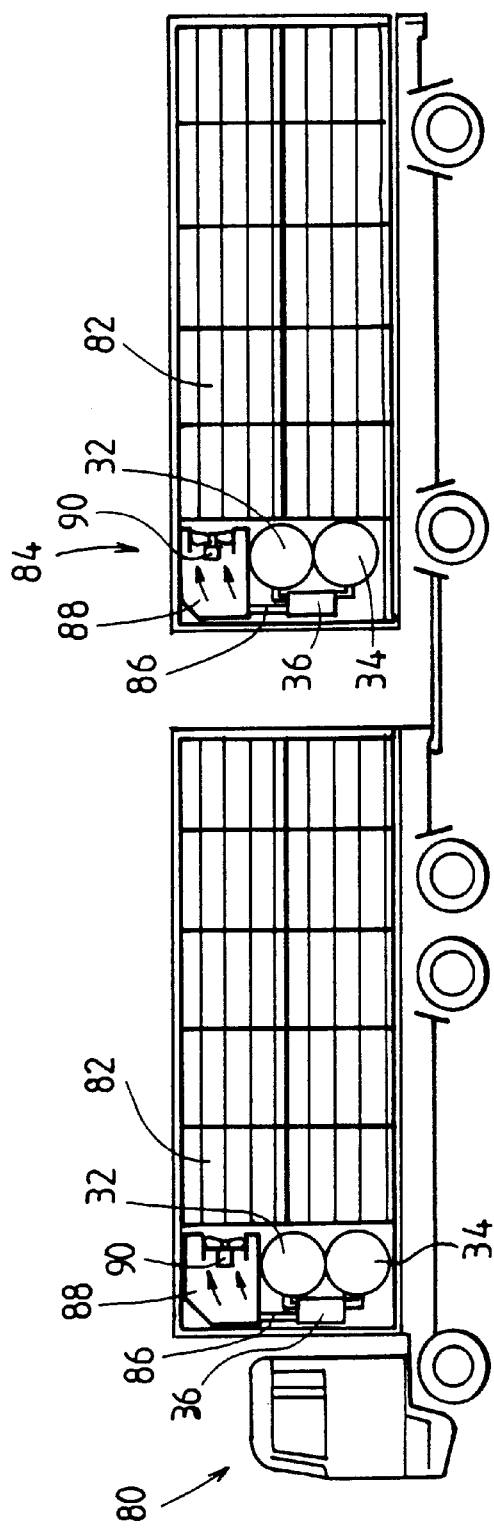
FIG. 5a shows diagrammatically in cut-away side view a lorry with trailer according to the invention.

FIG. 5a shows a lorry 80 on which a number of containers 82 are loaded. The lorry 80 pulls a trailer 84, on which containers 82 are also placed. Gas tanks 32 and 34 are situated in the loading space of the lorry 80 and the trailer 84, each tank being connected to a mixing device 36 which is connected by way of a line 86 to an area 88 from which a gas mixture can be introduced into the loading space of the lorry 80 or the trailer 84 by means of a fan 90. The loading spaces are covered in as gastight a manner as possible here, for example by means of a tarpaulin. Since the containers have an open structure, the gas mixture spreads easily through the entire loading space in all containers.

Figure 5B:
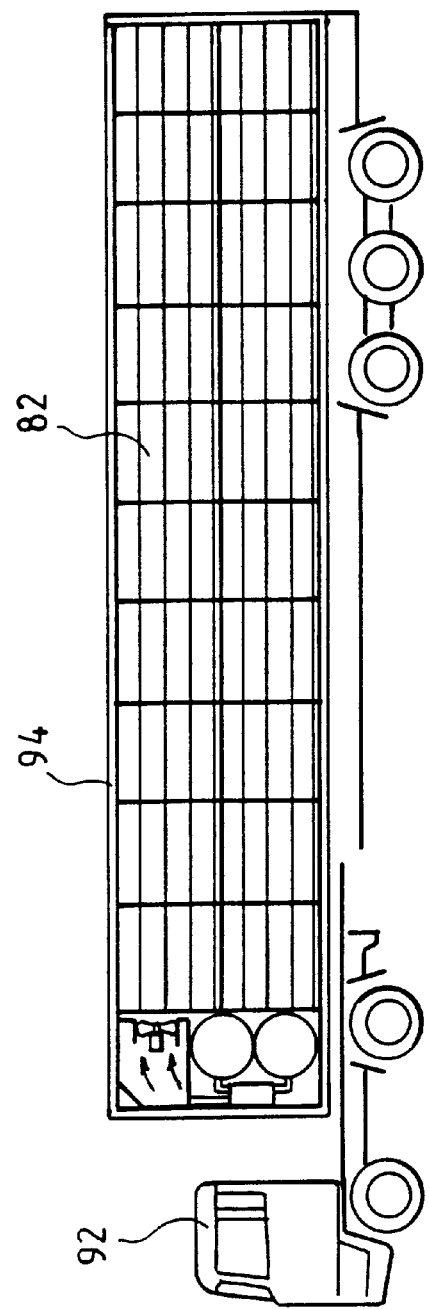
FIG. 5b shows diagrammatically in cut-away side view a truck with semi-trailer according to the invention.

FIG. 5b shows a truck 92 with a semi-trailer 94 which, in a manner similar to that of the lorry 80 and the trailer 84, is provided with gas tanks 32 and 34, a mixing device 36, an area 88 and a fan 90 for spreading a specific gas mixture in the loading space of the semi-trailer filled with containers 82.

With the conveying means shown in FIGS. 5a and 5b, birds in a container can be at least partially made unconscious while they are being transported from a breeding farm to a slaughterhouse.

The tanks 32 and 34 can contain, for example, carbon dioxide and oxygen, respectively, which gases are mixed in the mixing device 36 in such a way that the atmosphere in the tunnel 16 (FIGS. 3a, 3b, 4a, 4b) or the loading spaces of the lorry 80, the trailer 84 or the semi-trailer 94 (FIGS. 5a, 5b) contains at least 15% by volume oxygen and at least 25% by volume carbon dioxide.

As shown by way of example in FIG. 3b by a broken line, the conveying means 4 can also be equipped with one or more stunning electrodes 55 which are connected to a suitable electrical supply (not shown in any further detail), it being ensured that the surface of the belt conveyor 22 is electrically conducting and also connected to the supply. The electrodes can also be integrated with the fingers 10 of the brushes 8.

As shown by way of example in FIG. 4b by broken lines, the conveying means 4 can also be equipped with a spray unit 57 which brings na stunning fluid into contact with the birds 54.

While the invention has been described and illustrated in its preferred embodiments, it should be understood that departures may be made therefrom within the scope of the invention, which is not limited to the details disclosed herein.

What is claimed is:

1. A method for collecting poultry and transporting the poultry to a slaughterhouse, wherein the birds are at least partially made unconscious prior to their arrival at the slaughterhouse.

2. The method of claim 1, wherein the birds are at least partially made unconscious for a predetermined period of time.

3. The method of claim 1, wherein the birds are at least partially made unconscious prior to or during their collection.

4. The method of claim 3, wherein the birds are at least partially stunned until they have been loaded onto a goods vehicle after their collection.

5. The method of claim 1, wherein a stunning fluid is administered to the birds.

6. The method of claim 5, wherein the birds are conveyed through a tunnel containing a stunning gas.

7. The method of claim 1, wherein the birds are brought into contact with at least one electrode.

8. The method of claim 1, wherein the birds are given a feed containing a stunning agent.

9. The method of claim 1, in which the birds are transported in crates or containers in a goods vehicle, the birds being made at least partially unconscious by introducing a stunning gas into the crates or containers on the goods vehicle.

10. A device for collecting birds prior to transportation of the birds to a slaughterhouse, comprising:

pick-up means for picking up the birds; and conveying means for conveying the birds picked up in the pick-up means to collection means, the device further comprising a stunning device which is set up in the path of the conveying means.

11. The device of claim 10, wherein the stunning device comprises a tunnel to which a stunning gas is supplied.

12. The device of claim 11, wherein the stunning gas is supplied from one or more tanks.

13. The device of claim 10, wherein the stunning device comprises at least one electrode which is adapted to come into contact with the birds.

14. The device of claim 10, wherein the stunning device comprises fluid-administering means which are adapted to administer a stunning fluid to the birds.

15. The device of claim 10, wherein the conveying means comprise a belt conveyor.

16. The device of claim 10, wherein the collection means comprise a lifting platform for a crate or container, which platform is movable in the horizontal and vertical directions.

17. The device of claim 10, wherein the collection means comprise a belt conveyor.

18. The device of claim 10, wherein the collection means comprise a rotary table.

19. The device of claims 10, wherein the device is mobile.

20. A goods vehicle for transporting birds to a slaughterhouse, with a loading space for accommodating crates or containers containing the birds, the vehicle further comprising means for introducing a stunning gas into the crates or containers (82).

21. The goods vehicle of claim 20, wherein the stunning gas is supplied from one or more tanks.

* * * * *